US009084013B1

(12) United States Patent
Arini et al.

(10) Patent No.: US 9,084,013 B1
(45) Date of Patent: Jul. 14, 2015

(54) DATA LOGGING FOR MEDIA CONSUMPTION STUDIES

(71) Applicant: Google Inc., Mountain View, CA (US)

(72) Inventors: Nick Salvatore Arini, Southhampton (GB); Ken Krieger, Jackson, WY (US); Simon Michael Rowe, Berkshire (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/081,242

(22) Filed: Nov. 15, 2013

(51) Int. Cl.
H04N 21/442 (2011.01)

(52) U.S. Cl.
CPC .............................. H04N 21/44204 (2013.01)

(58) Field of Classification Search
USPC ............. 725/14, 9, 10, 11, 27, 37, 38, 40, 42, 725/43, 46, 50, 56, 60, 61, 68; 715/201, 715/202, 700, 704, 727, 771; 348/526, 589, 348/600, 723, 725, 729; 340/508, 5.81, 340/12.3, 13.22
See application file for complete search history.

(56) References Cited

U.S. PATENT DOCUMENTS

| 8,135,606 | B2 | 3/2012 | Dupree | |
|---|---|---|---|---|
| 8,700,657 | B2* | 4/2014 | Frett et al. | 707/769 |
| 8,863,223 | B2* | 10/2014 | Abbruzzese | 725/153 |
| 2008/0147461 | A1 | 6/2008 | Lee et al. | |
| 2008/0148307 | A1* | 6/2008 | Nielsen et al. | 725/9 |
| 2008/0263579 | A1* | 10/2008 | Mears et al. | 725/9 |
| 2009/0018918 | A1 | 1/2009 | Moneypenny et al. | |
| 2009/0307061 | A1* | 12/2009 | Monighetti et al. | 705/10 |
| 2010/0004977 | A1* | 1/2010 | Marci et al. | 705/10 |
| 2010/0124967 | A1* | 5/2010 | Lutnick et al. | 463/17 |
| 2010/0199296 | A1* | 8/2010 | Lee et al. | 725/14 |
| 2010/0293566 | A1* | 11/2010 | Valdez | 725/14 |
| 2011/0138416 | A1* | 6/2011 | Kang et al. | 725/39 |
| 2011/0256520 | A1* | 10/2011 | Siefert | 434/322 |
| 2012/0050012 | A1* | 3/2012 | Alsina et al. | 340/10.1 |
| 2012/0124624 | A1* | 5/2012 | Lau et al. | 725/39 |
| 2013/0055097 | A1 | 2/2013 | Soroca et al. | |
| 2013/0111511 | A1* | 5/2013 | Besehanic | 725/14 |
| 2013/0205311 | A1* | 8/2013 | Ramaswamy et al. | 725/9 |
| 2013/0205314 | A1* | 8/2013 | Ramaswamy et al. | 725/14 |
| 2013/0311478 | A1* | 11/2013 | Frett et al. | 707/741 |

* cited by examiner

Primary Examiner — Jefferey Harold
Assistant Examiner — Mustafizur Rahman
(74) Attorney, Agent, or Firm — John D. Lanza; Foley & Lardner LLP

(57) ABSTRACT

A method for data logging in a panel media consumption study includes broadcasting an attraction signal by a device associated with a panelist during display of media on a first media device in an area of interest, the media for consumption by the panelist; receiving the attraction signal at a receiving device in the area of interest, determining information related to the received attraction signal, determining a characteristic value of the information; identifying the device of the panelist as at a first location within the area of interest based on the characteristic value of the information; and logging data related to the display of media as panel media consumption data.

19 Claims, 13 Drawing Sheets

DATA LOGGING FOR MEDIA CONSUMPTION STUDIES

BACKGROUND

Media consumptions studies attempt to estimate population behaviors based on observed activities of a population sample. A panel of volunteers (known typically as panelists) agrees to be monitored while engaging in specific activities such as watching television or grocery shopping. A panel operator designs the panel, including the composition of the panelists. The panelists' behaviors are recorded and analyzed, and then extrapolated to the larger population.

Assembling such a panel can be time consuming and expensive. Furthermore, errors in the data collection efforts will adversely affect the validity of any analysis and extrapolation.

SUMMARY

A method for data logging in a panel media consumption study includes broadcasting an attraction signal by a device associated with a panelist during display of media on a first media device in an area of interest, the media for consumption by the panelist, receiving the attraction signal at a receiving device in the area of interest; determining information related to the received attraction signal; determining a characteristic value of the information; identifying the device of the panelist as at a first location within, the area of interest based on the characteristic value of the information; and logging data related to the display of media as panel media consumption data.

A method for conducting a media consumption data study includes recording media displayed on a first media device for consumption by a panelist; and attributing a position of the panelist based on a determined position of a device attributed to the panelist, comprising: estimating a first position of the signals between the device and a position marker associated with the first media device, estimating second and subsequent positions of the device based on further signals between the device and the position marker, and determining a track of the device based on the first, second, and subsequent positions.

A system for determining, recording, and analyzing media consumption includes a mobile media device attributed to a viewer; and an instrumented study site comprising one or more first media devices displaying media for consumption by the viewer. The study site includes a plurality of position markers that exchange broadcast and reply signals with the mobile media device, and a server that receives information related to the broadcast and received signals; receives information related to the displayed media; and attributes media consumed by the viewer based on the received information related to the displayed media and the broadcast and received signals.

A method for conducting a panel-based media consumption study includes establishing a plurality of study sites for logging media consumption data for the study; identifying one or more panelists to participate in the study; detecting display of media at one of the study sites; and determining a position of a panelist in a study site at which the media is displayed, including receiving at a first device associated with the study site, signals from a second device associated with the panelist, analyzing the received signals to locate the second device in the study site, and defining the position of the panelist as coinciding with the location of the second device. The method then includes conducting a media consumption data logging operation based on the defined position of the panelist.

DESCRIPTION OF THE DRAWINGS

The detailed description refers to the following figures in which like numerals refer to like items, and in which.

DETAILED DESCRIPTION

Figure 1A:
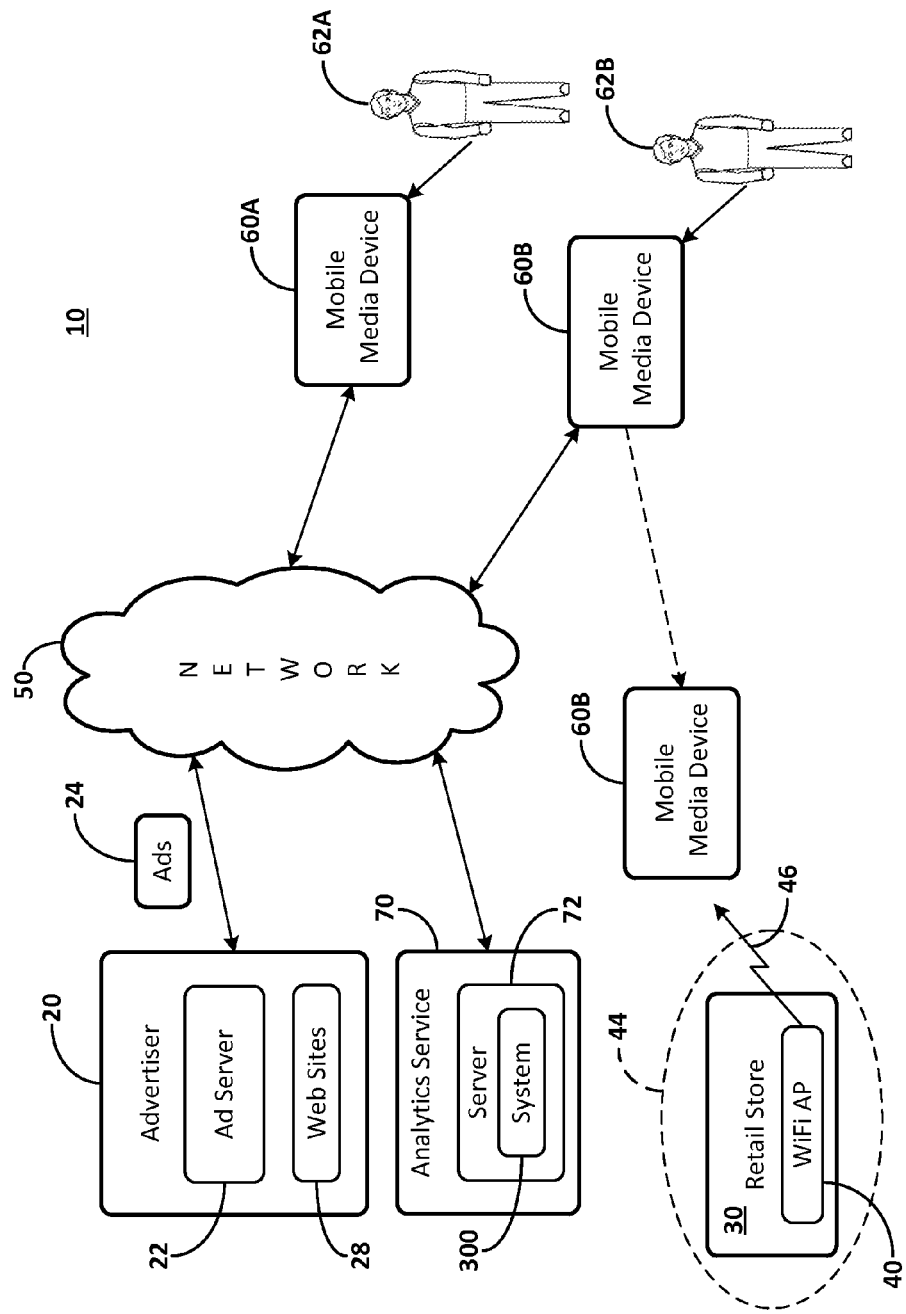
FIGS. 1A-1C illustrate example environments in which media consumption studies may be completed and in which mobile media location is monitored as an aspect to the studies.

A panel is an assembly of individuals whose activities are monitored, reported, and analyzed as part of a media consumption study. One goal of a media consumption study may be to observe the natural behavior of the study participants during a comprehensive data collection effort. This goal may be hard to achieve because of data collection compliance issues and because of the mobile nature of media consumption devices, as described below. Further complicating matters may be a desire to link certain behaviors, such as purchases, to prior media consumption activity.

Study participants, or panelists, agree to monitoring, reporting, and analysis of their media consumption activities, sometimes in return for compensation. Panelists are chosen to reflect a statistically representative sample of a larger population. The analysis of the panelists activities is extrapolated to the larger population. Panels are used to determine television viewing habits, Internet Web usage, product purchases, and other activities.

Considering television viewing and Internet activity as examples of media consumption, one way to collect data is to require the panelists to log this activity in manual logs. Alternately, the panel operator may provide individual panelists, or households with multiple panelists, with metering devices that record and report on the panelists' activities. For example, a panelist may agree to installation of a meter at the panelist's residence. The meter records the panelist's television viewing and Internet activity, and reports the data to a remote server. Along with agreeing to installation of the meter, the panelist also consents to the monitoring of television, Internet, and other activity as part of a media consumption study.

The same panelists may further agree to have their purchase activities monitored. For example, a panelist's exposure to television advertisements may be monitored and recorded. The same panelist may report purchase activity, and if a product purchased matches a product in an advertisement the panelist viewed, an analytics system may correlate the ad exposure with the product purchase.

One challenge in the field of media consumption studies is panelist compliance; that is does the panelist fully comply with all panel data monitoring, logging, and reporting requirements. Manual logging may be particularly difficult to enforce, as the panelists may be required to accurately log the time, date, location, and identity of their media consumption activities. As noted above, as an alternative to maintaining manual logs of media consumption activity, high quality data for a media consumption study may be obtained by installing meters. Such meters may be installed on every media device in a participating household so as to record the viewing date, time, audio signature, and identity of the panelists consuming the media. Optionally, a meter may be installed in a router at the panelists' residence between the panelists' media devices and a remote server that supplies or delivers media for consumption. In one approach, panelists register their media devices and log in and out of viewing using the router-based meter. In either a manual logging or metered approach, however, the ultimate success of the media consumption study still rests on panelist compliance with the requirements of data collection.

Furthermore, many media devices are mobile. Thus, an in-home, router based meter may not capture panelist media consumption when the panelist operates a mobile media device such as a smart phone away from the panelist's residence. Thus, in some scenarios, panelist activities may not be recorded without some mechanism to log media consumption away from the residence. Even within a panelist's residence, particularly a multiple panelist residence, accurate monitoring media consumption by a specific panelist may be difficult, and may require each panelist to log in and log out of a media device when entering or exiting a room. Thus, full compliance with a panel's designed data logging requirements may not be achieved.

However, in practice, and depending on the data logging implementation, even perfect compliance may have drawbacks. For example, since one goal of a media consumption study is to observe natural behavior of the panelist, the more the panelist is asked to log study-specific behavior, the less natural the measured behavior. However, with too little resolution in logging panelist activity, the value of the study data may be reduced and some potentially interesting panelist behaviors may be last. Thus, a compromise may be struck between resolution and quality of log data versus the probability that a panelist actually will log the desired information accurately, if at all. For example, a compromise event logging interval may be established, and the missing information inferred through statistical means.

Another challenge with media consumption studies is detecting the location of media consumption activities. Consider a media consumption study site, which may be a panelist's residence or place of work, or may be a store the panelist frequents. As noted above, the mobile nature of some mobile media devices makes locating media consumption challenging; that is because media consumption is increasingly performed on a variety of mobile media devices, monitoring media consumption throughout the full extent of the study site (residence, workplace, retail store, etc.).

Yet another challenge facing panel operators is attributing panelist behavior to prior media consumption activities; for example, determining how and when panelists respond to advertising or other media they previously consumed. To that end, there is also value in knowing when panelists enter a retail store or other physical location outside of the study site (generally the panelists; residence) where they may have been influenced by media exposure to visit or make a purchase at that store or location. This may be as simple as a panelist entering a store or location, or may be as sophisticated as understanding a panelist's activity patterns within the store or location. For example, the panel operator may want to know which rides at an amusement park the panelist took, and in what order, or which aisles the panelist visited in a store, how long the panelist lingered, and in what order the panelist traversed the store. All of these may signals may be correlated with advertising and media exposure being measured in the context of the panelist.

To address these issues of panelist compliance, data logging, and mobile media device monitoring, attributed behavior, and other media consumption challenges noted herein, disclosed are automated data logging systems and methods. The systems and method may free a panelist from many of the burdensome and/or troublesome aspects of data collection for a media consumption study, and to the extent the systems and methods relive the panelist's logging burden, the panelist may behave in a more natural manner. In an aspect, the automated data logging systems perform data logging as a background activity of a media device that already may be in use by the panelist; this leads to improved temporal resolution, which in turn leads to greater insight into panelist behavior and reduced likelihood of meaningful panelist behavior being lost. Furthermore, automated data logging may eliminate panelist bias in media consumption studies and intentional misreporting of data to hide activities for which a panelist might be personally embarrassed (even though panelist behaviors may be used only in aggregate and the activities panelist's would not be directly attributable). Data quality also may be enhanced because the automated data logging systems make it possible to detect momentary interruptions by a panelist from viewing a media stream (for example, when a panelist leaves a room in which the media stream is being viewed), which may provide a richer insight into media consumption activities. For example, a panelist may stay in a room to watch a car commercial but leave momentary when a cereal commercial plays. Furthermore, in the context of exposure to media for billing purposes (e.g., billing by impression for a television advertisement) the panel operator may be able to more accurately deliver these measurements to advertisers by virtue of knowing the media device location and which panelist actually were exposed to the advertisements.

The systems and methods address panelist location with respect to media devices and media being consumed. In an aspect, the systems take advantage of wireless radio receivers used for communication that generally are present in mobile media devices and may utilize signal strength of other nearby fixed radios to determine the location of a mobile media device at any given time. For example, most media devices are WiFi and Bluetooth enabled. In addition, for many mobile media devices, cellular telephony radios can provide an additional axis of information.

The systems may use a combination of these signals to provide a unique fingerprint of a particular location or room for the purposes of determining the location of media consumption.

In controlled settings such as a pre-configured study site, the converse could be true as well. Local fixed-location devices within the study site may have a list of enrolled media devices that may be detected within the study site and used for determining media consumption location. This location information within the study site may be used to determine a specific location where a particular panelist consumed certain media and to establish usage patterns that may be otherwise meaningful in the context of the media consumption study.

For example to make mobile media advertising reliable, the methods and systems provide a detection event when a mobile media device of interest detects the WiFi (or Bluetooth or Bluetooth Low Energy (BILE)) signal from an access point of interest. A mobile media device of interest may be a device that an advertiser wants to serve an advertisement. A WiFi access point of interest may be an access point associated with or related to the subject matter of the advertisement to be served. As a part of a mobile media device advertising campaign, advertisements may be served on the mobile media device when the mobile media device approaches or crosses the WiFi access point of interest. For example, as a mobile media device approaches a coffee shop, the mobile media device may receive an advertisement for a latte. The advertisement may induce the operator (and the operator may be a panelist) of the mobile media device to enter the coffee shop and purchase the latte. Actual entry of the mobile media device into the coffee shop may be determined when the mobile media device crosses a WiFi-boundary centered on a WiFi access point established in the coffee shop. The entry may be determined at the mobile media device and then communicated to an ad server; alternately, the entry may be determined at the ad server. Furthermore, when the operator is a panelist, the entry may be recorded and reported as part of the panelist's behavior. This entry of the mobile media device into the coffee shop may be attributed to the just-served advertisement, and may be considered a conversion. Tying operator actions to mobile advertisements may be an important aspect of the coffee shop owner's mobile media device advertising campaign.

In an alternative scenario, the operator/panelists may have recently been exposed at the study site (the panelist's residence) to an advertisement for a latte, perhaps with a coupon offer. Shortly after, the panelist enters the coffee shop as indicated by the WiFi access point detection. This trip to the coffee shop then may be attributed to the recently viewed coffee latte advertisement.

In these two example scenarios, a coffee shop owner (i.e., an advertiser) wants to serve latte advertisements on certain mobile media devices. Note that in the herein disclosed systems, the mobile media device need not physically connect through the WiFi access point to the WiFi network; simply detecting the presence of the WiFi access point by the mobile media device may be sufficient.

Each WiFi access point will have a unique identifier. If the unique identifier (MAC address, service set identifier (SSID), or other identifier) for the access point is captured and logged by a location system on the mobile media device, a lookup, or matching, process may be performed on a server side to establish visitation. However, server side matching may require the logging of all MAC addresses of WiFi access points and logging of precise location data of all WiFi access points on the server.

In an alternative, a matching process may be performed locally on the mobile media device. This mobile media device-based matching process may involve uploading by the mobile media device of a match list of MAC addresses/SSID's corresponding to the WiFi access points of the stores of interest to a particular mobile media device. Then, an application or system on the mobile media device, which has access to the WiFi data on the mobile media device, may extract the MAC address (or SSID) of any WiFi access points detected by the mobile media device. The application or system may run a match process to check the detected MAC addresses against the match list and report only matches back to the server: store visit detected. The store visit detect signal may include a time stamp. However, the timestamp may be blurred (e.g., to a 3 hour period) and the specific store identification may be hidden or blurred (e.g., the mobile media device visited a store in the greater San Francisco area).

The mobile media device may monitor a current location using a multi-level geo-location and matching process that conserves power on the mobile media device. In an aspect, a first level location system of the mobile media device may perform first level geo-location operations as the mobile device approaches the geographic area defined by a WiFi boundary, activates one or more triggers (described below), and/or operates in a manner suggesting the mobile media device would be a good candidate to receive a mobile advertisement. The first level location system may notify a second level location when the mobile media device moves sufficiently close to the geographic area such that monitoring the device location using a second level location process is warranted and/or operates one or more triggers. The mobile media device may determine that it is approaching and entering the geographic area by triangulating locations of access points of a wireless local area network (WLAN) or by using position coordinates from a global positioning system (GPS), and other methods.

In an aspect, the mobile media device may determine its proximity to a WiFi access point of interest using a multi-level gee-locating process. A first level location process may provide coarse-grained location tracking. Once the mobile media device is within a specified distance of the WiFi access point, or upon the occurrence of a specific event, or when the mobile media device crosses the WiFi boundary, gee-locating on the mobile media device may switch to finer-grained location tracking. In another aspect, the first level location process may be just as accurate as the second level location process; however, the first level location process may not be available because the mobile media device is in an area where line-of-sight satellite signals are not available. In these aspects, the first level location process may involve GPS tracking and the second level location process may involve WiFi tracking.

In the above example of switching between GPS location tracking and WiFi location tracking, the decision logic embodied in the mobile media device may consider a number of WiFi-on and WiFi-off triggers. Examples of turn-on triggers include coarse geo-boundaries based on network tower triangulation, store proximity based on GPS data collected under normal circumstances, directions and navigation maps usage, and disconnected from a hands free cradle in a car. Examples of turn-off triggers include connected to a home WiFi or work WiFi network access point, connected to a hands free cradle in the car, and accelerometers and inertial detectors detect rapid movement such as a car driving.

The above-mentioned triggers may be used together. For example, components of the mobile media device may detect the device is connected to its cradle and is moving rapidly, the device then (within a defined time threshold) detects the device stops and is removed from its cradle. This combination of events could trigger a coarse location search using network cell tower triangulation, if that triangulation then detects proximity to a store, the proximity on-trigger detection, could trigger a GPS location check; if the GPS check indicates a store visit, location tracking in the mobile media device could switch to or add WiFi and/or BTLE scanning. The WiFi and/or BTLE scanning and a matching process may execute until a series of the reverse events is detected (e.g. lost signal from the WiFi or BTLE point) or reconnection to the cradle/rapid movement.

Once a WiFi-on trigger is activated by the mobile media device, the mobile media device may capture the unique identifier of the WiFi access point. The mobile media device then may execute an on-board match process that compares onboard stored WiFi identifiers and their associated locations to the captured identifier. If the matching process produces a match, the mobile media device may switch to WiFi tracking on.

In yet another aspect, location tracking on the mobile media device may employ a third level location process. For example, the mobile media device may employ Bluetooth Low Energy (TLE) tracking. In this example, a BTLE beacon may broadcast an RE signal that includes the beacon's position coordinates (e.g., latitude, longitude), which may be detected by the mobile media device. The position coordinates may provide improved location accuracy for the current location of the mobile media device by virtue of the mobile device adopting the position coordinates of the BILE beacon as its own position coordinates. The known locations of a number of BILE beacons in a geographic area may define a boundary that encompasses the geographic area. Upon determining that the mobile media device crossed the boundary established by the BILE beacon, a location system in the mobile media device may transfer the location monitoring to the BTLE location system. The BTLE location system may monitor for BILE beacon signals and continuously update (or maintain) its location as that of the BTLE beacon. When the mobile media device loses contact with the BTLE beacon for a defined period of time (e.g., 5 minutes) or when the mobile media device exits the boundary defined by the BTLE beacon, the location system on board the mobile media device may transfer location tracking to a less power-intensive process, such as GPS tracking.

In an alternative that involves Bluetooth or BTLE beacons, a device attributed to a panelist may act as a BTLE beacon and may periodically broadcast attraction or advertisement signals that may be received by position markers or similar receiving devices. The attraction or advertisement signal may include a unique identification of the device attributed to the panelist. The position markers may determine a received signal strength of the received attraction signal. The position markers may provide time and day information, the unique identification, and the received signal strength to a local or remote server that subsequently processes the information received from the position marker to determine a first and subsequent positions (i.e., a track) of the device attributed to the panelist (and by attribution, a track of the panelist). In this alternative, the device attributed to the panelist may be a mobile media device such as a smart phone or a tablet. In an aspect, the device attributed to the panelist may be a wearable device, such as a bracelet, or a wrist watch, for example.

In a further aspect, when the device attributed to a panelist is a mobile media device, such mobile media device also may receive a reply signal from a position marker. The reply may include an identification of the position marker and the signal strength of the attraction signal as received at the position marker. The mobile media device then may provide this position marker identification, signal strength, and time/date information to a remote server for further processing.

Similar concepts may be applied to movement monitoring in a study site. Taking the example of a panelist's residence as the study site, the panelist may agree to installation of devices specifically intended to facilitate such movement monitoring. For example, fixed beacons could be installed at the location of each fixed media device (e.g., television, desk top computer, in-home router). Alternately, fixed position markers may be installed in the panelist's residence. One example would be a radio frequency identification transceiver that broadcasts a RF signal detectable by RFID tags emplaced in the mobile media devices. Alternately, the panelist's fixed and mobile media devices in conjunction with each other may be used to provide this movement monitoring. That is, in much the same manner as with WiFi access point detection in a retail store environment, devices in the study site may allow determination of movement of mobile media devices within the study site. If a television is on and being monitored in a living room and a panelist's smart phone is determined to be within 6 feet of the television, the systems may determine that the panelist is viewing the media being displayed on the television.

In an embodiment, fixed media devices in the study site may be equipped to communicate with mobile media devices at the study site. In an aspect, the fixed media devices may transmit signals using, for example, BTLE radios, and the mobile media devices may lock on to the signals. Wireless radios in the mobile media devices may search for a highest power signal, and when the mobile media device is located in a specific room of the study site, and that room includes a fixed media device with an appropriate transmitting device, the mobile media device may lock on to that fixed media device. This process may continue as the mobile media device is moved from one room to another (presumably by a panelist who owns or uses the mobile media device). The locked indication may include a time stamp. Finally, the transmitting devices may receive a unique identifier (SSID) of the mobile media devices. The transmitting devices may provide this locked on indication and other data to a local central server in the study site, or may send the indication to a remote server. The receiving server may correlate the identity of the fixed media device as a proxy for location, and may correlate the location of the mobile media device, its identification, the time stamp, and other data to arrive at an indication of media consumption by the mobile media device. The receiving server also may determine favorite locations of the panelist based on movement analysis by the receiving server. Thus, in this aspect, received signal strength by the mobile media devices forms the basis for location determination. In this aspect, no programming is needed on the mobile media devices in order to perform location determinations.

In this aspect also, the fixed media devices may be provided with a list of mobile media devices to monitor, and may ignore an unknown mobile media devices that enter the study site. Furthermore, the fixed media devices may be placed in the study site so as to facilitate mobile media device identification and location determination.

As an alternative to location determination at the fixed media devices, the mobile media devices may include programming to identify a wireless radio with a highest signal strength. The identity of this wireless radio (as a proxy for the fixed media device, and hence location within the study site), identity of the mobile media device, a time stamp, and other data may be acquired or present on the mobile media device and them may be passed to the local central server or to a remote server.

As an alternative to received signal strength, the study site may be populated with a set of beacons that provide other signals detectable by either the fixed or the mobile media devices. Such a beacon may be a WiFi beacon or a RFID beacon (e.g., a RFID transceiver).

As an alternative to providing indications to a local central server at the study site, the determinations and correlations may be made at each fixed media device and the results may be passed to the local central server or to the remote server.

In an aspect, either the local central server the remote server may determine a place, such as a room, within the study site, where media consumption occurs, and through correlations such as those noted above, may identify a location of the mobile media devices in each place during media consumption as well as day and time information. Furthermore, the servers may refine to locations to indicate where in a room the mobile media device (an hence, presumably the panelist) is during the media consumption. Still further, the servers may determine the presence of multiple, known mobile media devices in a specific room, indicating, perhaps, the presence of multiple panelists.

In yet another aspect, the servers may determine mobile device location based on behavioral signals. For example, a mobile media device may be moved to a game room, and may remain in the game room throughout the night. The servers may infer that the panelist is not in the game room for this entire time.

In an embodiment, when a mobile media device is moved away from the study site, such as to a retail store, systems at the remote server may detect entry of the mobile media device into the retail store, and subsequent movement of the mobile media device within the retail store. The remote server may be provided with a map of the retail store, access points or beacons within the retail store, product placement displays, and other data that allows the server to infer buying habits based mobile media device movement, recent exposure to advertising (including mobile advertisements), traffic pattern effect on purchasing, and similar inferences. For example, the server may know that a mobile media device and its panelist recently were served a mobile media device advertisement. The advertisement may induce the panelist to traverse the retail store to find and purchase the product that is the subject of the advertisement. Along the path, the retailer may provide other products that may be of interest to the panelist. The servers may detect when and if the panelist stops and apparently makes such an impulse purchase. In addition, of course, the panelist may log such an impulse purchase.

Thus, as described herein, the mobile media device may serve as a proxy for the panelist; that is, the panelist is presumed to be wherever the mobile media device is. This assumption may hold, in some aspect, only as long as the mobile media device is powered on.

The mobile media device location information also may be provided by or derived from components of a commercial wireless network, a local wireless network, or by a process of database correlation. For example, receiving units of the commercial or local networks may measure radiated power (signal strength) from the mobile media device, and send the information to a local server or remote server, where the server computes circular location information and determines a point of intercept that corresponds to the location of the mobile media device. Alternately, components of the commercial or local networks may computer the location of the mobile media device and provide the location to the local or remote server. The commercial or local network components also may determine or facilitate determination of altitude of the mobile media device, in addition to latitude and longitude. One means for determining altitude is by computing slant range based on angle of arrival information. Another altitude measurement technique involves proximity of the mobile media device to equipment of the commercial or local networks that are at a known altitude.

A local central server may covertly activate a mobile media device in a study site to determine its location. This activation may include the use of a camera or microphone of the mobile media device to gather information about the device location.

The local central server may rely on the underlying commercial wireless network for position location of a mobile media device. For example, once a mobile media device is identified as within the study site or other area of interest, the appropriate local or remote server may send a short message to equipment in the commercial wireless network. That equipment may have the geographic location of the mobile media device, and may continue to track the location of the mobile media device. The equipment of the commercial wireless network then may send the geographic location of the mobile media device to the server, and may update the location as the mobile media device moves within the study site or other area of interest.

The local or remote server may determine mobile media device location using database correlation techniques. For example, each point (location defined with some degree of granularity) in a coverage area or area of interest, or study site may have associated location characteristics, and a database of those characteristics may be incorporated into the servers, along with algorithms to recognize and process the characteristics data. Upon receiving such characteristics data associated with a specific mobile media device or a panelist, the server consults the characteristics database to see if the received characteristics correspond to any of the defined points in the coverage area. These characteristics may include signal strength of the mobile media device, measured angle of arrival of a signal, intercept by one specific WiFi point, time of entry within the study site, and other characteristics.

The local or remote server may determine mobile media device location based on a combination of several location techniques or mechanisms. For example, a remote server may determine a location of a mobile media device based on a combination of WiFi triangulation and RFD proximity detection.

Once the local or remote server the location (x, y, z (optional)) of the mobile media device, that location can be compared to the intended boundaries of the study site or other area of interest, and if the mobile media device is within those boundaries, a data logging event may begin. Such a data logging event may continue as long as the mobile media device remains within the designated boundaries of the study site or area of interest. In an aspect, the data logging event may end based on other conditions of the mobile media device. For example, if the mobile media device is powered off, the data logging event may end.

In some embodiments, a location of a panelist may be determined directly, and without reference to the panelist's mobile media devices. For example, a local central server at a study site may use voice recognition of a panelist to determine the panelist's location. In another example, a panelist may agree to wear a bracelet of other device that provides a location signal detectable by components of a media consumption study system, either at a study site or at other locations that may be monitored. The bracelet could incorporate, for example, a smart RFID tag, a BTLE beacon, or other transmitting mechanism.

These and other aspects of panelist and mobile media device location monitoring are disclosed below.

FIG. 1A illustrates an example environment in which media consumption studies may be completed and in which mobile media location is monitored as an aspect to the studies. The environment of FIG. 1A illustrates mobile media device monitoring, including geo-locating, when the mobile media device is away from, or outside of a study site such as a panelist's residence. Furthermore, the environment of FIG. 1A is described primarily with geo-location by WiFi tracking. However, other geo-location methods could be used in the environment of FIG. 1A.

In FIG. 1A, environment 10 includes advertiser 20, store 30, mobile media devices 60 and analytics service 70. Some components of the advertiser 20, store 30, mobile media devices 60 and analytics service 70 communicate over network 50.

The advertiser 20 operates ad server 22 to provide advertisements 24 that may be served to a mobile media device 60 based in part on the actual geographical location of the mobile media device 60. The advertiser 20 may operate the ad server 22 to provide advertisements 24; additionally, the advertiser 20 may operate the server 22 to provide one or more Web sites 28. The advertiser 20 may provide an advertising campaign that specifies a demographic, a mobile media device type, and other constraints.

The store 30 may be a physical structure that is related to the advertiser 20. For example, the store 30 may be a coffee shop, and the advertiser 20 may own and operate the store 30 and similar coffee shops in locations other than that of the store 30.

The store 30 includes WiFi access point 40 that establishes a WiFi boundary 44 (shown in dotted line) centered on the store 30. The WiFi access point 40 provides access to a WiFi network for certain media devices, including mobile media devices 60, which are capable of detecting a broadcast signal 46 from the WiFi access point 40.

In FIG. 1A, store 30 is shown with one WiFi access point. However, the store 30 may include multiple WiFi access points.

The WiFi access point 40 may be uniquely identified by a MAC address or SSID, for example. The unique identification of the WiFi access point 40 may be included in the signal 46 broadcast from the WiFi access point 40.

The network 50 may be any communications network that allows the transmission of signals, media, messages, voice, and data among the entities shown in FIG. 1A, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 50 includes the Internet, cellular systems, and other current and future mechanisms for transmission of these and other media. The network 50 may be both wired and wireless. The network 50 may include the WiFi network accessed through the WiFi access point 40.

Mobile media devices 60 may be may be a tablet, a smart phone, or a laptop computer, for example. A mobile media device 60 is operated by panelist 62. An example of a mobile media device 60 is described with respect to FIGS. 2A and 2B.

In FIG. 1A, mobile media device 60B and its panelist 62B are shown approaching the store 30 and its corresponding WiFi boundary 44. During movement of the mobile media device 60B, and in other situations, certain personal information related to the panelist 62B may be obtained as part of a media consumption study run through analytics service 70.

In situations in which the systems disclosed herein collect personal information about media device panelists 62, and/or their mobile media devices 60, or may make use of personal information, the panelists may be provided with an opportunity to control whether programs or features collect information (e.g., information about a panelist's social network, social actions or activities, profession, a panelist's preferences, or a panelist's current location), or to control whether and/or how to receive advertisements from an ad server that may be more relevant or of interest to the panelist. In addition, certain data may be treated in one or more ways before it is stored or used, so that personally identifiable information is removed. For example, a panelist's identity may be treated so that no personally identifiable information can be determined for the panelist, or an panelist's geographic location may be generalized where location information is obtained (such as to a city, ZIP code, or state level), so that a particular location of a panelist cannot be determined. Thus, the panelist may control how information is collected about the panelist and used by an ad server.

The analytics service 70 may establish and operate a media consumption study. The analytics service may operate server 72 for this purpose. The server 72 may execute system 300, described with respect to FIG. 3.

Figure 1B:
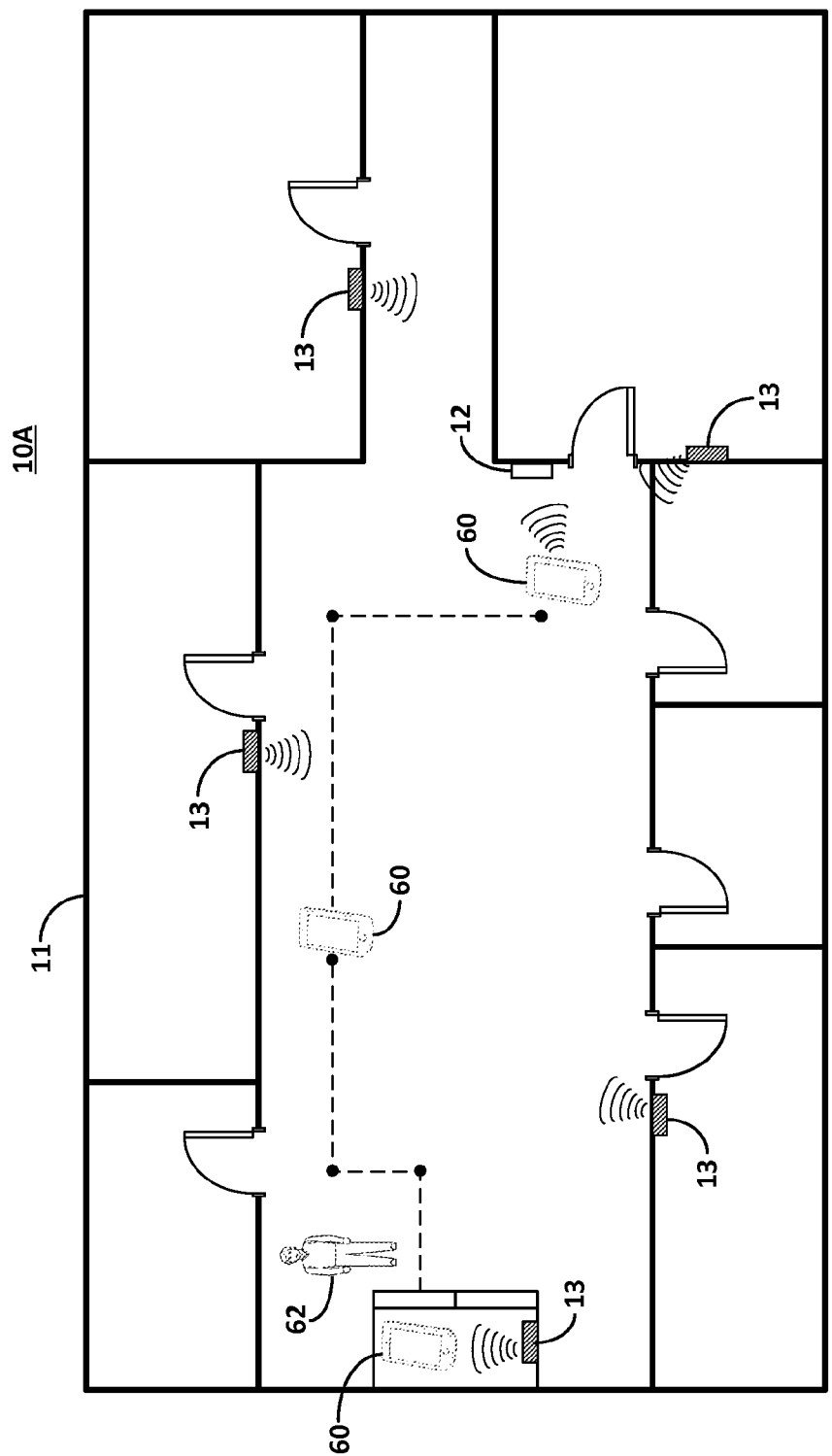

FIG. 1B illustrates another environment in which a media consumption study including geo-locating of a mobile media device is enabled. In FIG. 1B, environment 10A includes a building 11, which is shown as a floor plan of a shopping center. Such a building may not allow reception of line of sight signals needed to receive accurate positions via satellite. However, and instead of WiFi access points, the building 11 may be equipped with a system of beacons or position markers that may be used in conjunction with accelerometers, gyroscopes, compasses, and device position constraints installed on mobile media device 60 to provide an accurate indoor device location. In an aspect, the position markers are RF transceivers 13 that are part of RFID system 12. The RF transceivers 13 may broadcast continually.

A RFID tag-equipped mobile media device 60 may enter building 11 via an entrance containing a RF transceiver 13. The RF signals may be detectable by the mobile media device's RFID tag. Thus, a RF transceiver 13 at the building entrance may detect entry of the mobile media device 60 (and consequently, panelist 62). As the panelist 62 moves through the building 11, other RFID transceivers 13 may broadcast signals that are answered by the RFD tag of the mobile media device 60. The detections of the mobile media device 60 may be provided to remote analytics server 72 (see FIG. 1A). The remote analytics server 72 may be programmed with the physical locations of the RF transceivers 13. Thus, the server 72 may be able to monitor the movement of the panelist 62 through the building 11.

In some aspects, the mobile media device 60 may identify a location using a GPS receiver just prior to entering the interior of the building 11. This GPS location may then be used with accelerometer, gyroscope, compasses, and position marker information to provide an estimated interior location of the mobile media device 60 as the panelist 62 traverses the building 11.

In another aspect, described below with respect to FIG. 1C, the panelist 62 may agree to wear a bracelet device, or other wearable device, that broadcasts an attraction signal, or advertisement signal, which is detected by versions of the transceivers 13. In this aspect, the bracelets may be smart RFID tags, BTLE beacons, acoustic signaling device (outside the range of human hearing) and other wireless signaling devices, and the transceivers 13 may be equipped to detect the broadcast signals and relay the signals or information related to the signals, to a remote server for analysis.

Figure 1C:
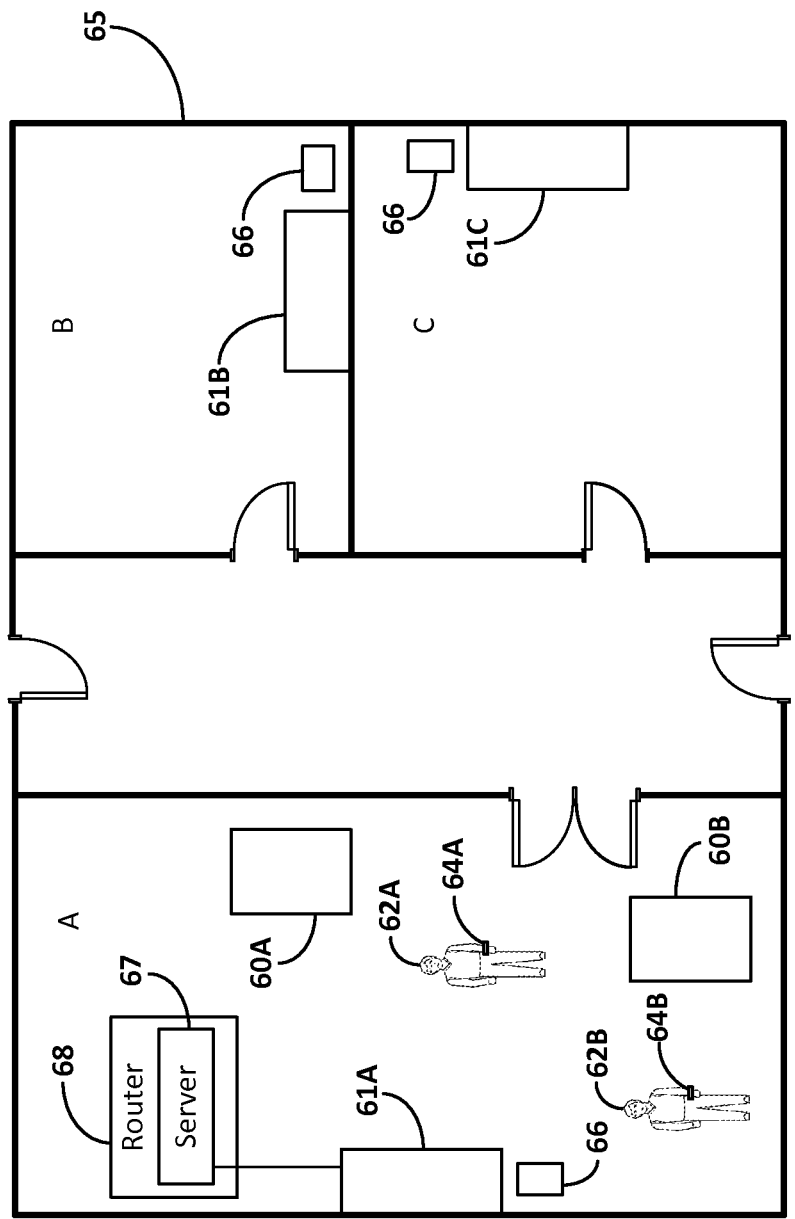

FIG. 1C illustrates an example study site (a panelist's residence) that has been configured to support a media consumption study. In FIG. 1C, residence 65 includes fixed media devices 61 and mobile media devices 60. The residence 65 is the home of two panelists 62.

Residence 65 includes fixed media devices 61A, B, C, placed in rooms A, B, and C. Also shown in residence 65 are mobile media devices 60A and 60B, operated, respectively, by panelists 62A and 62B. The fixed media devices 61A. 61B, and 61C may include devices to communicate with the mobile media devices 60A and 60B. Such devices may include small hardware devices 66 connected to an unused HDMI port of the fixed media devices. In an aspect, the devices 66 are repeaters that transmit a signal originating from a central location within the study site 65 and provide any replies back to the central location.

In another aspect, each of the panelists 62A and 62B may agree to wear, respectively, beacons 64A and 64B, as for example, in the form of a bracelet. The functions of these beacons are described later.

Also shown in FIG. 1C is local central server 67. Local central server may be installed with an in-home gateway device such as a wireless router 68. The wireless router couples off-site communications serves (e.g., and Internet service provider) with the fixed and mobile media devices.

The local central server 67 can support data collection from a number of different wireless technologies that are in use in the radiofrequency spectrum, including: Global System for Mobile Communications (GSM), General Packet Radio Service (GPRS), Code Division Multiple Access (CDMA), Evolution-Data Optimized (EV-DO), Enhanced Data Rates for GSM Evolution (EDGE), CDMA 2000 1XRTT (one times Radio Transmission Technology), 3GSM, High Speed Packet Access (HSPA), Digital Enhanced Cordless Telecommunications (DECT), Digital AMPS (IS-136/TDMA), and Integrated Digital Enhanced Network (iDEN). Fourth generation (4G) devices being developed and deployed include 4G Long Term Evolution (LTE) and 4G WiMAX. Other wireless technologies can be expected.

Assuming panelists 62A and 62B will have on their possession, their respective mobile media devices 60A and 60B, movement of the panelists among rooms A, B, and C may be monitored using one or more of the geo-location processes described herein as well as other geo-location processes. In one aspect, the mobile media devices 60A and 60B initiate a location process by reference to the fixed media devices 61A, 61B, and 61C. In another aspect, the roles are reversed. Thus, a media consumption study using residence 65 may be able to match panelists 62A and 626 to rooms and fixed media devices over which media is being provided. Moreover, this media consumption determination may be completed without the need for logging in and out by the panelists, making any manual log entries, or completing any burdensome requirements. Thus, the media consumption activities of the panelists in the residence 65 may be monitored in a natural manner.

In an embodiment, in lieu, or in addition to the position monitoring described above with respect to FIG. 1C, the study site (residence) 65 may be equipped to monitor panelist positions based on signaling between the beacons 64A and 64B, on the one hand, and the devices 66, on the other hand.

In an aspect, the beacons 64A and 64B may be worn as bracelets.

In an aspect, the beacons 64A and 64B may be BTLE beacons. The beacons 64A and 64B periodically broadcast an attraction, or advertisement signal. The broadcast attraction or advertisement signal may include a unique identification of the beacon. The attraction or advertisement signal may be detected by one or more of the devices 66 situated around the study site 65. In an aspect, the devices 66 are BLTE to WiFi gateways. The devices 66 may continually scan for BTLE attraction signals from the beacons 64A and 64B. When received, the devices 66 may relay the signals along with the received signal strength to the local central server 67 or the router 68. The local central server 67 may process the received signals, or may in turn pass the received signals to a remote server such as the analytics server 72 (see FIG. 1A).

At either the local central server 67 or the remote (e.g., analytics) server 72 a collection of the received signals from a single beacon 64 are processed to identify the position of the associated panelist 62 within the study site 65. For example, a signal broadcast by beacon 64A may be detected by different devices 66 (e.g., in each of rooms A, B, and C). However, the signal at each of the devices 66 may be received with a different signal strength and at a different arrival time. These differences in the signal may be used in the server processing the signals as part of the panelist position determination.

In this same embodiment, the fixed media devices 61 also may broadcast a signal detectable by the devices 66. Alternately, the devices 66 may be connected to the fixed media devices 61. When the fixed media devices 61 are displaying media, the devices may so signal to the local central server 67 or the signal may be relayed to the remote server 72. The local central server 67 or remote server 72 may be provided with a reference position for each of the fixed media devices 61. Alternately, the local central server 67 or the remote server 72 may determine the positions of the fixed media devices 61 based on signals received from the fixed media devices 61.

Based on the received signals from the beacons 64 and the fixed media devices 61, the local central server 67 or the remote server 72 may estimate, with some probability, that panelist 62A is near fixed media device 61A, and thus determine if panelist 62A is watching television (in room C), for example. Then, based, for example, on STB logs, or other television viewing logs, including SSP logs, the servers 67 or 72, may attribute programs watched to specific panelists. Thus, the panelist data may be collected and analyzed with little explicit effort required on the part of the panelists 62.

Note also, that a similar scheme may be adapted to other study sites such as in the example of FIG. 1B.

Figure 2A:
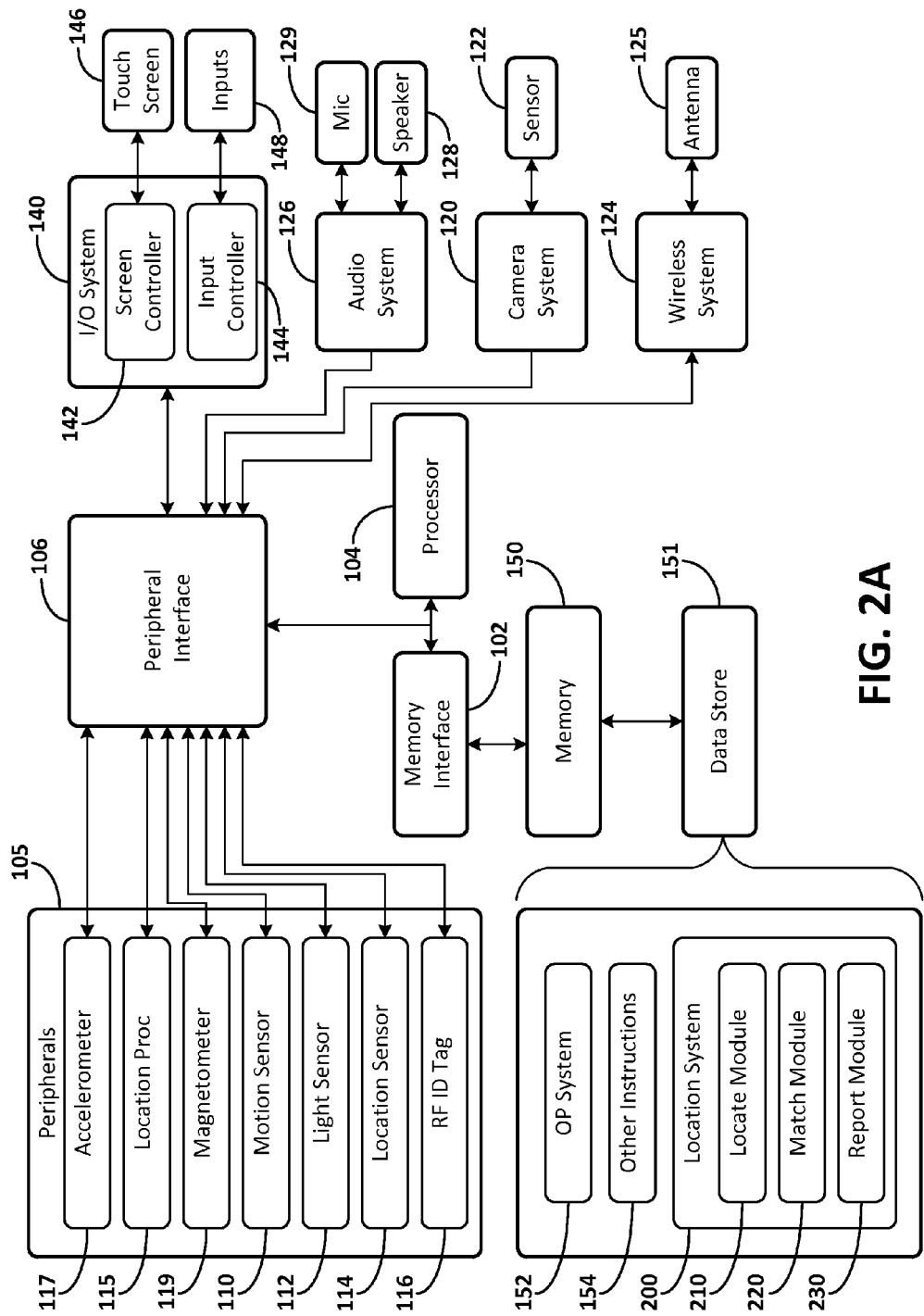
FIGS. 2A and 2B illustrate an example mobile media device used in media consumption studies.

FIG. 2A illustrates a mobile media device 60 that supports WiFi-based geo-location and other locating processes. Mobile media device 60 includes memory interface 102, one or more data processors, image processors and/or processors 104, and peripherals interface 106. Memory interface 102, one or more processors 104 and/or peripherals interface 106 can be separate components or can be integrated in one or more integrated circuits. Processors 104 can include one or more application processors. The application processors may be integrated in one single process chip. The various components in mobile media device 60, for example, may be coupled by one or more communication buses or signal fines.

Sensors, devices, and systems (peripherals 105) are coupled to peripherals interface 106 to provide multiple functions. For example, motion sensor 110, light sensor 112, and proximity sensor 114 are coupled to peripherals interface 106 to facilitate orientation, lighting, and proximity functions of the mobile media device 60. Location processor 115 (e.g., a GPS receiver) provides geo-locating operations. Magnetometer 119 provides data that may be used to determine the direction of magnetic North. Thus, electronic magnetometer 119 may be used as an electronic compass. Accelerometer 117 provides data that may be used to determine change of speed and direction of movement of the mobile media device 60.

RFID tag 116, which may be a passive tag or an active tag, may be interrogated by an RF signal from a RF transmitter, and may send a signal in return with an identification (ID) unique to the mobile media device 60. The response signal may be an indication that the mobile media device 60 is in close proximity to the RF transmitter.

Camera system 120 and optical sensor 122 (e.g., a charged coupled device (CCD) or a complementary metal-oxide semiconductor (CMOS) optical sensor) provides camera functions, such as recording photographs and videos.

Communication functions are provided through one or more wireless communication systems 124, which may include radio frequency receivers and transmitters and/or optical (e.g., infrared) receivers and transmitters, and antenna 125. The specific design and implementation of a communication system 124 may depend on the communication network(s) over which a mobile media device 60 is intended to operate. For example, a mobile media device can include communication systems 124 designed to operate over a GSM network, a WiFi network, and a Bluetooth/Bluetooth Low Energy network.

Audio system 126 is coupled to speaker 128 and microphone 129 to provide voice-enabled functions, such as voice recognition, voice replication, digital recording, and telephony functions, and transmission and reception of acoustic signals outside the range of human hearing.

Input/Output (I/O) system 140 includes touch screen controller 142 and/or other input controller(s) 144. Touch-screen controller 142 is coupled to a touch screen 146 or pad. Touch screen 146 and touch screen controller 142 may, for example, detect contact and movement using touch sensitivity technologies. Other inputs may include a push-button key pad 148 and other buttons, including a hands free cradle button.

Memory interface 102 is coupled to memory 150. Memory 150 may include high-speed random access memory and/or non-volatile memory, such as one or more magnetic disk storage devices, one or more optical storage devices, and/or flash memory (e.g., NAND, NOR). Memory 150 may be connected to data store 151, which may store operating system 152, which in turn may include instructions for handling basic system services and for performing hardware dependent tasks.

Data store 151 also may store other instructions 154 including communication instructions to facilitate communicating with other media devices (fixed or mobile), one or more computers and/or one or more servers. The instructions 154 further may include graphical user interface instructions to facilitate graphic user interface processing; sensor processing instructions to facilitate sensor-related processing and functions; phone instructions to facilitate phone-related processes and functions; electronic messaging instructions to facilitate electronic-messaging related processes and functions; web browsing instructions to facilitate web browsing-related processes and functions; media processing instructions to facilitate media processing-related processes and functions; GPS/Navigation instructions to facilitate GPS and navigation-related processes and instructions; camera instructions to facilitate camera-related processes and functions; magnetometer data and instructions to facilitate compass display and related functions. The data store 151 also may store one or more applications (not shown), such as a mobile banking application. Finally, the data store 151 stores location system 200.

As shown, location system 200 includes location module 210, match module 220, and report module 230. These components of the location system 200 are described with respect to FIG. 2B.

Each of the above identified instructions and applications can correspond to a set of instructions for performing one or more functions described above. These instructions need not be implemented as separate software programs, procedures, or modules. Furthermore, various functions of the mobile media device 60 may be implemented in hardware and/or in software, including in one or more application specific integrated circuits.

Figure 2B:
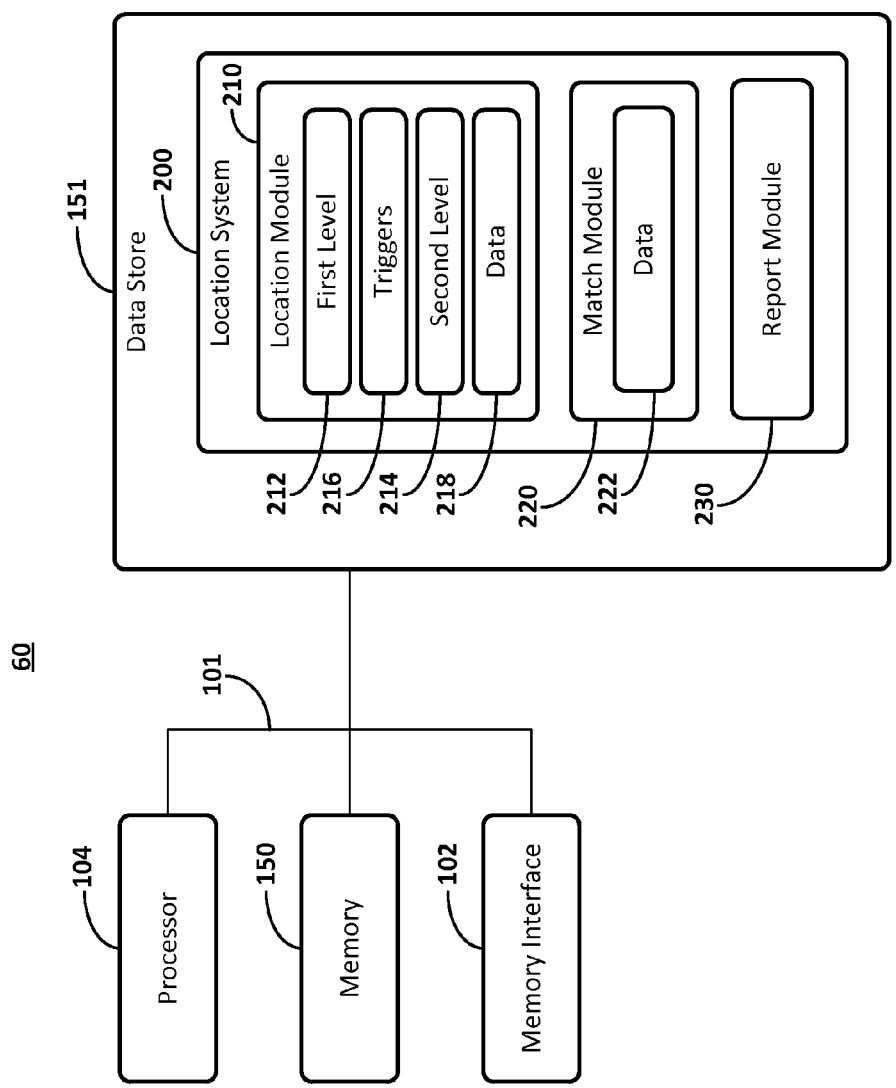

FIG. 2B illustrates selected components of a mobile media device 60 that are used to implement WiFi-based geo-locating. In FIG. 2B, location system 200 is stored in data store 151 and read into memory 150 by processor 104 using data and communication bus 101 and memory interface 102. The data store 151 is a non-transitory computer readable storage medium.

The location system 200 includes location module 210, match module 220, and report module 230. The location module 210 includes first level location engine 212, second revel location engine 214, application triggers 216, and location data 218.

The location module 210 includes first level location engine 212, second level location engine 214, application triggers 216, and location data 218. First level location engine 212 provides instructions for executing a first level location process, which may be, for example, GPS-based locating. The engine 212 also provides instructions for monitoring operation of the mobile media device 60 to determine if a trigger-on event is activated. For example, the mobile media device 60 may execute a navigation application to show a map and directions to store 30. If a trigger-on event activation is detected, the engine 212 may notify the second level location engine 214.

The second level location engine 214 executes instructions for second level locating. In an embodiment, the second level locating is WiFi-based locating. The engine 214 also provides instructions for monitoring operation of the mobile media device 60 to determine if a trigger-off event is activated. For example, the engine 214 may be used to determine when the mobile media device 60 no longer is within range of the signal broadcast by WiFi access point 40. When a trigger-off event activation is detected, the engine 214 may notify the engine 212.

The application triggers 216 include specific actions with optional thresholds to determine when location tracking may switch between the first and second level location tracking processes.

Location data 218 includes a mapping of WiFi access points of interest, to include the locations and unique identifiers of each such WiFi access point.

The match module 220 compares a detected WiFi access point identifier to data 222 to determine a match.

The report module 230 reports matches to the ad server 22.

Figure 3A:
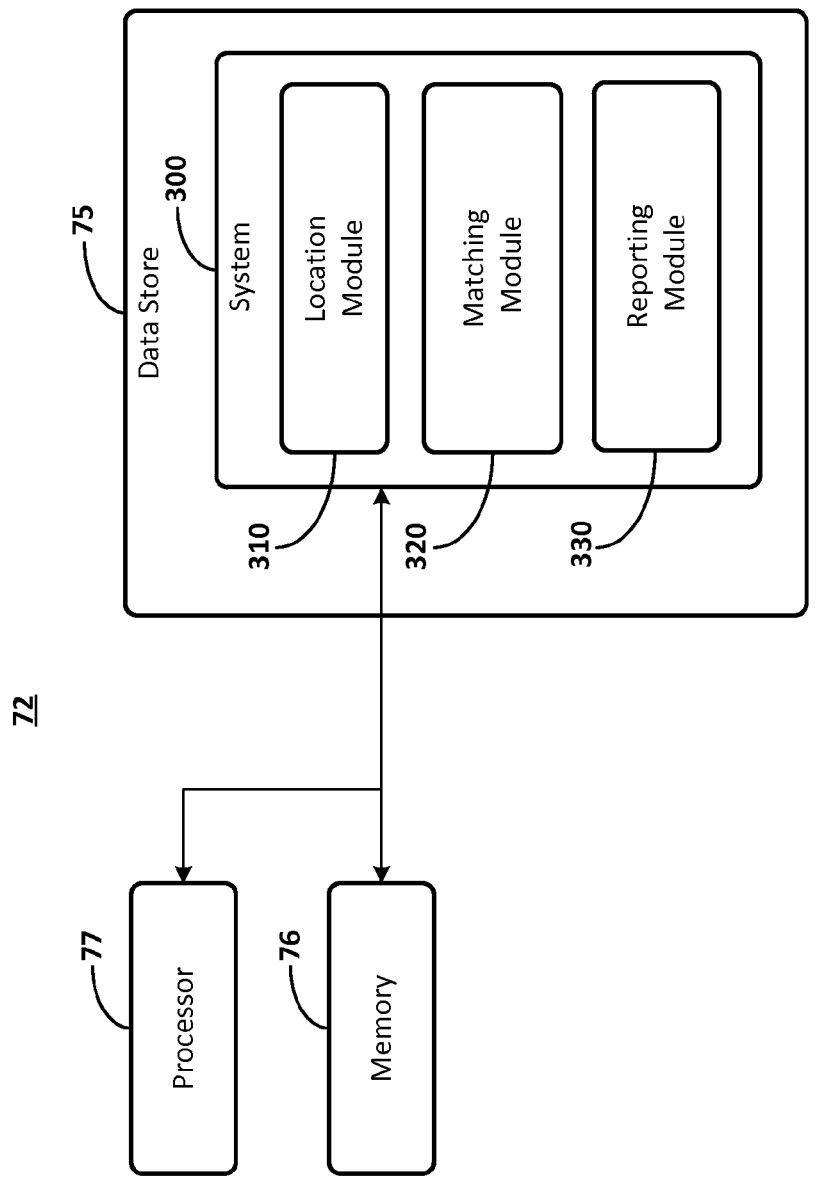
FIGS. 3A and 3B illustrate and example systems and network used in media consumption studies.

FIG. 3A illustrates a system that implements Win-based locating for mobile media devices. In an embodiment, the system 300 is implemented on server 72 of analytics service 70.

In FIG. 3A, system 300 is stored in data store 75, which is, or may include a non-transitory computer-readable storage medium. The system 300 may be loaded onto memory 76 and executed by processor 77 over communications and data bus 78. The system 300 includes location module 310, match module 320, and reporting module 330.

Location module 310 receives the unique identifier (MAC address or SSID) is captured and logged by a location system on the mobile media device 60, after which a lookup, or matching, process may be performed on a server side to establish visitation. However, server side matching may require the logging of all MAC addresses of WiFi access points and logging of precise location data of all WiFi access points on the server 72.

Matching module 320 maps the received unique identifier of a WiFi access point to a known mapping of WiFi access points. Receiving such a unique identifier from a mobile media device 60 of interest is an indication that the mobile media device 60 is within the vicinity of store 30. In the context of mobile advertising, such an indication may mean that ad served to the mobile media device 60 resulted in a conversion event (e.g., the mobile media device 60 enters the WiFi boundary 44 defined by the store's WiFi access point 40;

the panelist 62 operating the mobile media device 60 makes a purchase at the store 30). The mobile media device 60 may use WiFi, Bluetooth Low Energy, or Bluetooth tracking to confirm entry into the geographic area defined by the WiFi boundary 44.

Reporting module 330 may perform several functions. When matching is performed server-side (i.e., at server 72), the module 330 may provide a notification to the mobile media device 60. The mobile media device 60 then may request an ad be served to the mobile media device. Alternately, the ad may be served by the ad server 22 once the match is confirmed. When matching is performed at the mobile media device 60, the module 330 may receive a match notification from the mobile media device 60 and then may notify the ad server 22 to serve a mobile ad to the mobile media device 60. Finally, the module 330 report a conversion event (if known) to an appropriate component of the ad server 22.

Figure 3B:
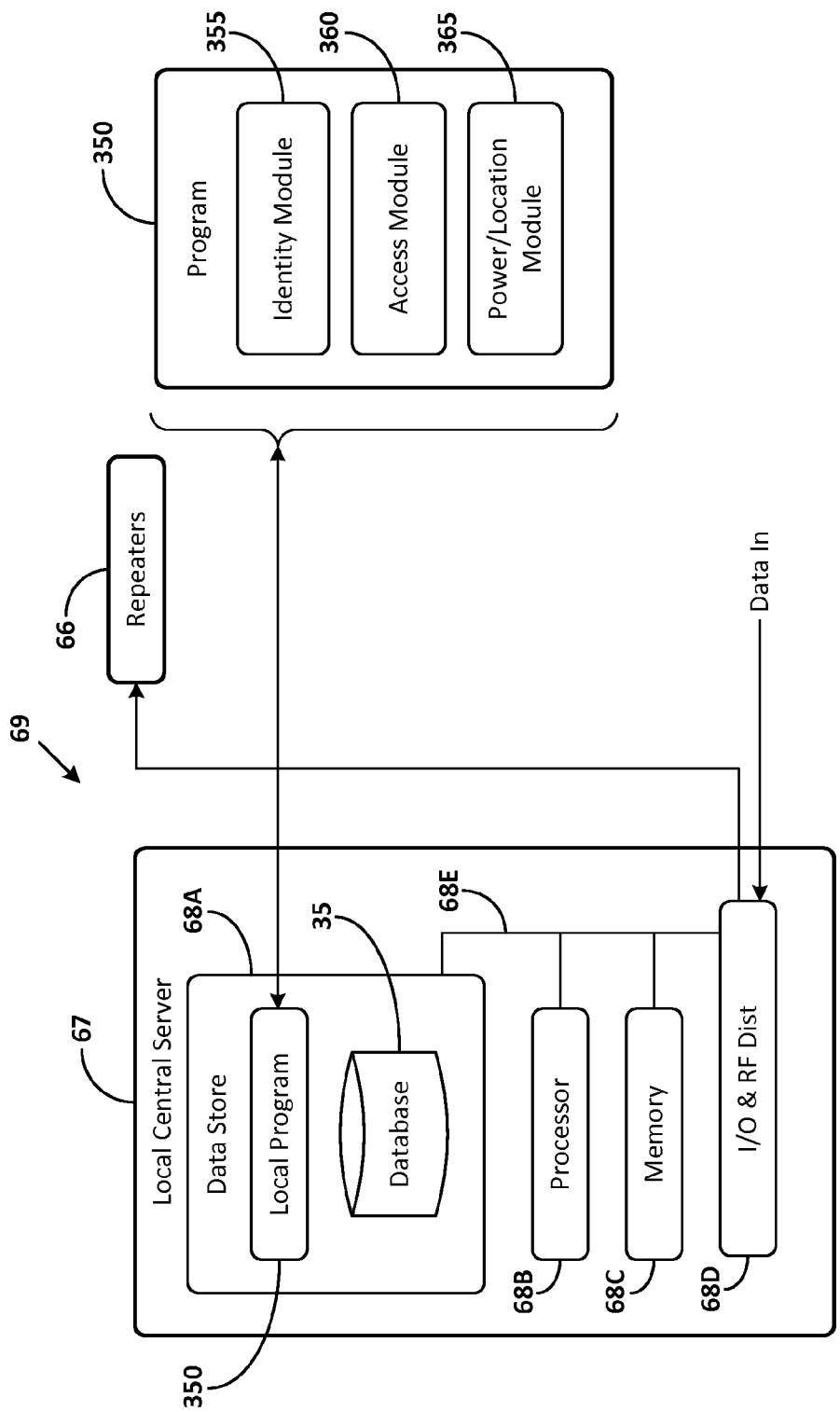

FIG. 3B is a block diagram of an example local network 69 that supports media consumption studies and that may be implemented in a study site, including in a panelist's residence. Local network 69 includes local central server 67, data store 68A, processor 68B, and memory 68C. The network 69 further may include repeaters 66 and any necessary directional antennae, base station(s) amplifiers, and radio frequency (RF) distribution equipment 68D and communications bus 68E. These components may operate to enable the server 67 to monitor, record, and analyze panelist media consumption within the study site 65.

Components of the network 69 may be implemented, as shown, as an adjunct to the router 68. Alternately, the network 69 may be implemented as a standalone system.

Certain components of the network 69 may be implemented as software, hardware, or a combination of hardware and software. The software components may be stored as a program (e.g., local program 350) on a non-transitory computer readable storage medium such as the data store 68A, and the machine instructions, may be loaded into memory 68C over bus 68E and executed on processor 68B. In addition to storing software components of the program 350, the data store 68A includes database 351, which stores various data associated with operation of the local network 69, including location registers, device status or classification (monitored, not monitored) and configuration data (phone number, EIN), and media consumption data, including media device location data.

The local program 350 includes equipment identity module 355 that receives and stores identifying information associated with mobile media devices 60; access module 360 that determines, based on setup or operational mode of the server 67, which of the mobile media devices 60 are to be monitored in the local network 69; and power/location module 365, which operates in conjunction with the I/O and RF distribution component 68D and repeaters 66 to establish the area or volume subject to media consumption monitoring.

The identity module 355 serves to determine an identity of a mobile media device 66 that is within the monitoring coverage area of the local network 69. Such identity may be by means of the device's telephone number or equipment identification number (EIN). Every mobile media device 60 has a unique identifying number or characteristic. If the device identifying number or characteristic (e.g., subscriber number) is registered with the server 67, the server 67 will monitor media consumption on that device.

Unknown mobile media devices 60 are those not specifically identified and registered with the local server 67. Unknown mobile media devices 60 may be allowed normal access to media provided through router 68 or otherwise delivered at the study site 65 over network 50.

As noted herein, the program 350 may initiate an identification and monitoring process by compelling a mobile media device 60 to register with the local server 67. However, the local server 67 need not always send a signal to compel registration. For example, when a mobile media device 60 is powered up, it may act as a scanning radio, searching through a list of control channels (e.g., one channel for each repeater 66 in the study site 65) for the strongest signal. The mobile media device 60, when powered up, re-scans every several seconds or when the signal strength weakens, regardless of other activity on the mobile media device. The mobile media device 60 may search for an identification code assigned to a local network 69. After selecting a channel, the mobile media 60 identifies itself by sending programmed codes that may identify the mobile media device 60, and consequently the panelist 62. In an aspect, these codes may include an EIN. This registration process automatically occurs even while the mobile media device 60 is idle. Moving from one coverage area (i.e., room in the study site 65) to another may re-trigger the registration process.

When a monitored mobile media device 60 attempts to place a call, send a text message, establish a data session, or initiate other actions within the study site 65, the local server 67 detects and records the action.

As noted, the local network 69 may include RF equipment that defines an area to be monitored. The area to be monitored may be limited to the study site 65, or only a room within the study site 65. In other contexts, an area to be monitored may be a commercial building, a retail store, an amusement park, a sports stadium, or a geographical area, for example. Furthermore, although the coverage area of the local network 69 ordinarily might extend beyond the boundaries of the physical building, sports stadium, or geographical area, by imposing boundary constraints, as described below, the enforced monitoring area of the local network 69 may match precisely the extent of the actual boundaries of the building, sports stadium, or geographical area.

The power/location module 365 includes processing component algorithms and database accesses needed to determine the location of a mobile media device 60 relative to the monitoring area defined by the local network 69. The module 365 may determine mobile media device location based on a GPS signal provided in conjunction with operation of the device 60. For example, the mobile media device 60 may query a GPS satellite to obtain geographic location information. The GPS-provided information may be used to both initially locate, and subsequently track, the mobile media device 60. The mobile media device 60 also may be tracked by a dead reckoning process and other processes. When connected in the local network 69, a query from the mobile media device 60 may cause the location information to be provided to the module 365. The module 365 also may take advantage of location information provided by components of the network 50, by local network 69-dedicated detection components, or by a process of database correlation to geo-locate the device 60. For example, using triangulation mechanisms, two or more repeaters 66 of the network 69 or 70 may measure radiated power (signal strength) from the device 60 and send the signals to the local central server 67, where the module 365 computes circular location information and determines a point of intercept that corresponds to the location of the device 60. The module 365 may implement other triangulation techniques and similar processes may be used for other signals. The module 365 also may determine altitude of the device 60, in addition to latitude and longitude. One technique for determining altitude is by computing slant range based on angle of arrival information. Another altitude technique involves proximity to repeaters 66 of the network 69 that are at a known altitude.

The module 365 may employ voice and sound recognition to determine the position location of a device 60.

The module 365 may activate a mobile media device 20 to determine its location. This activation may include the use of a camera or microphone of a device 60 to gather information about the device 60 position location.

The module 365 may use the network 50 for position location of a mobile media device 60. For example, once a device 60 is identified as within the coverage area created by the local server 67, the module 365 may cause a short message to be sent to corresponding equipment in the network 50. That equipment may have the geographic location of the device 60, and may continue to track the location of the device 60. The device location equipment of the network 50 then may send the geographic location of the device 60 to the module 365, and may update the location as the device 60 is moved within the coverage area of the local network 69.

The module 365 also may determine device location based on database correlation techniques. For example, each point (location defined with some degree of granularity) in the coverage area of the local network 69 may have associated location characteristics, and a database of those characteristics may be incorporated into the module 365, along with algorithms to recognize and process the characteristics data. Upon receiving such characteristics data associated with a specific device, 60 the module 365 consults the characteristics database to see if the received characteristics correspond to any of the defined points in the coverage area of the local network 69. These characteristics include signal strength of the device 60, measured angle of arrival of a signal, intercept by one specific WiFi point, time of entry within the coverage area of the local network 69, and other characteristics.

Once the module 365 determines location (x, y, z (optional)) of the device 60, that location can be compared to the intended boundaries of the local network 69 (or, for example, a room in the study site 65), and if the device 60 is within the boundaries, the device 60 may be monitored for media consumption and other activities and behaviors of the panelist 62.

FIGS. 4-6 are flowcharts illustrating example methods for conducting a media consumption study. The flow charts are based on the environments, systems, devices, and components of FIGS. 1A-3.

Figure 4A:
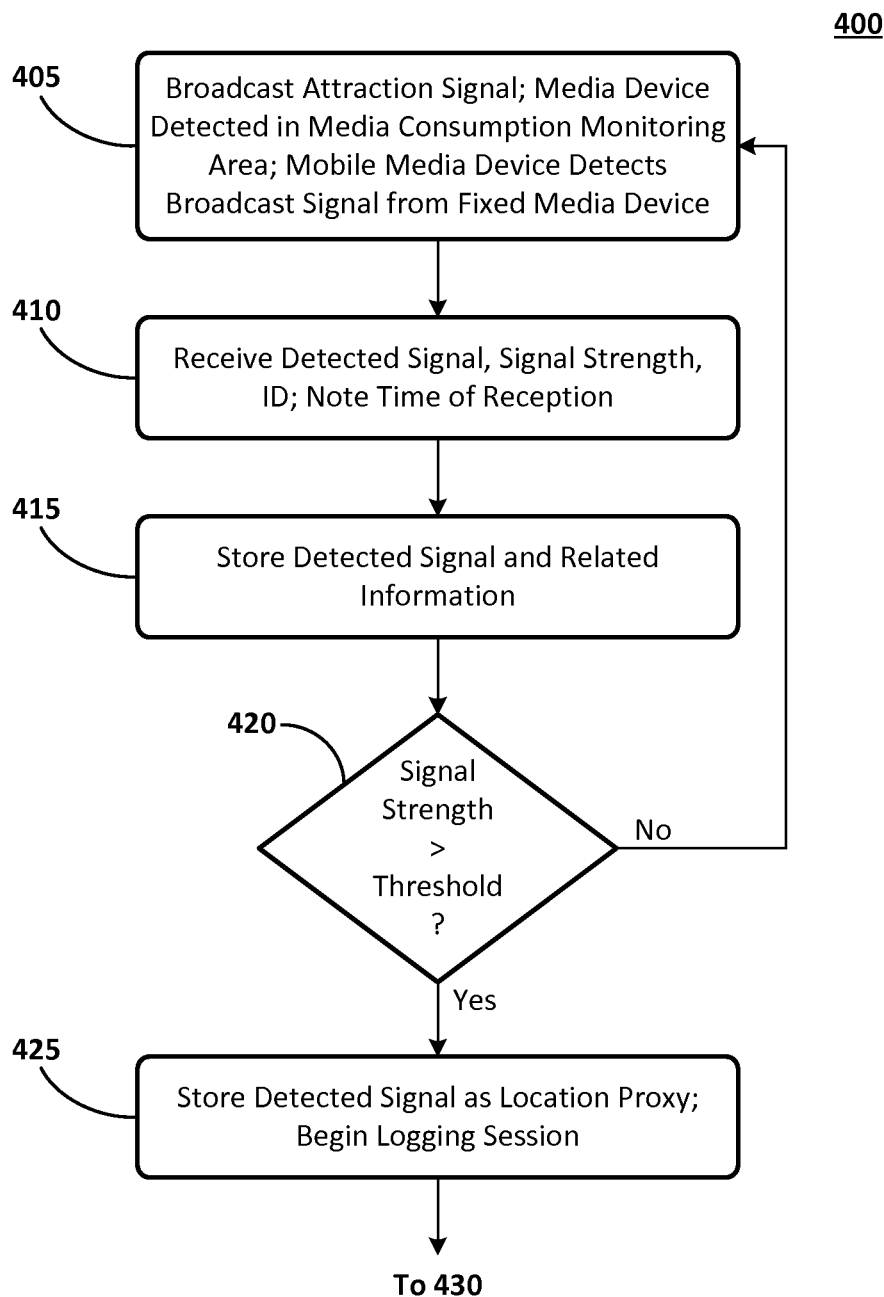
FIGS. 4A-6B are flow charts illustrating example media consumption methods.
Figure 4B:
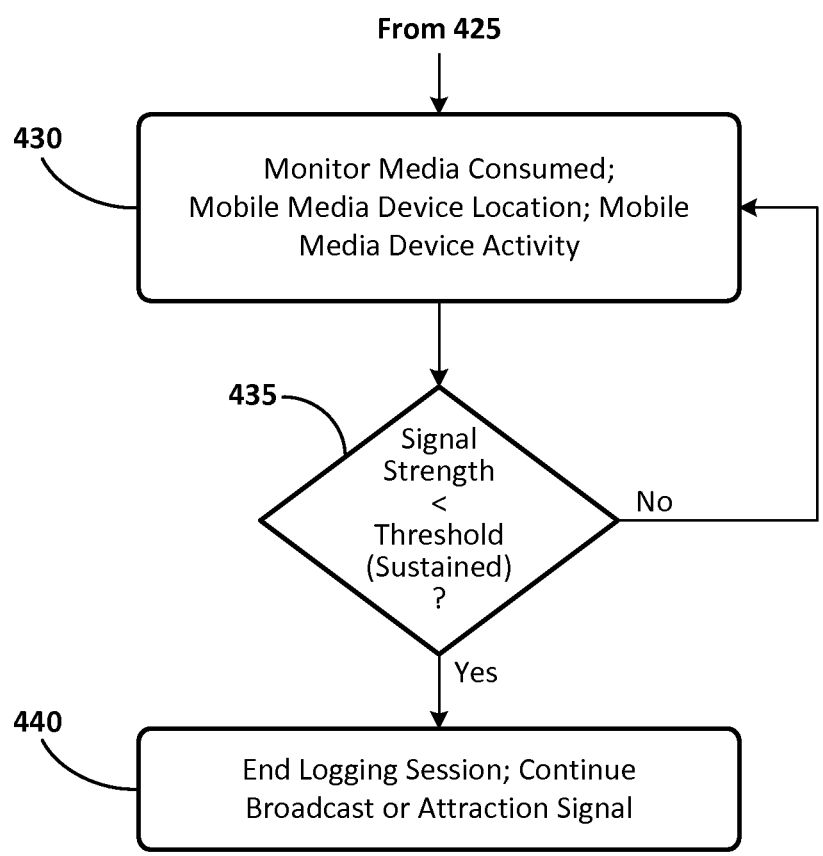

FIGS. 4A and 4B illustrate an example study-site method for detecting, locating, and logging mobile media devices during a media consumption study. In FIG. 4A, method 400 begins in block 405 when a panelist 62A with mobile media device 60A enters room A of study site (residence) 65 and fixed media device 61A is displaying a media stream (e.g., broadcast television programming). In addition to displaying the television programming, the fixed media device continually broadcasts a wireless signal that may be detected by a wireless radio on the mobile media device 60A. Note that the continual broadcast may occur only when the fixed media device 61A is displaying the television programming (or other media). At or near the entry to room C, the mobile media device 60A detects the wireless signal from the fixed media device 61A. In block 410, the mobile media device 60A passes this detection information to local central server 67. The detection information may include the signal strength of the detected signal. Local central server 67, in block 415 stores the detection along with the signal strength and a time stamp. In block 420 processing within the local central server 67 determines if the reported signal strength is at or above a specified threshold. If the threshold is reached or exceeded, in block 425, the processing notes the stored information as a proxy for the location of the mobile media device 60A and the processing begins a logging session for the mobile media device 60A (and, correspondingly, the panelist 62A). In block 420, if the signal strength does not meet the threshold requirements, the method 400 returns to block 405, and the mobile media device 60A continues scanning for wireless signals.

In block 430, the processing elements of local central server 67 monitor activity on the mobile media device 60A. For example, the panelist 62A may open an email account, access the Internet, and receive and send text messages. Certain of these communications pass through the router 68, and may be detected directly by the server 67. In block 435, the system 350 continues to monitor signal reception from the mobile media device 60 (the repeater 66 and media device 60 may exchange signals on a periodic basis) and determines if the signal strength (or another measure of location) fails below a threshold level. If the signal strength remains at or above the threshold, the method 400 returns to block 430. Otherwise, the method 400 moves to block 440. In block 440, the system 350 ends the logging session for the mobile media device 60. The system 350 may continue broadcasting an attraction signal as long as the fixed media device displays the media. If the fixed media device 61 is powered of, or if the media supply to the fixed media device 61 is interrupted, the system 350 may cease broadcasting the attraction signal. Alternately, the attraction signal may be broadcast continually, regardless of the status of the fixed media device and the displayed media.

Figure 5A:
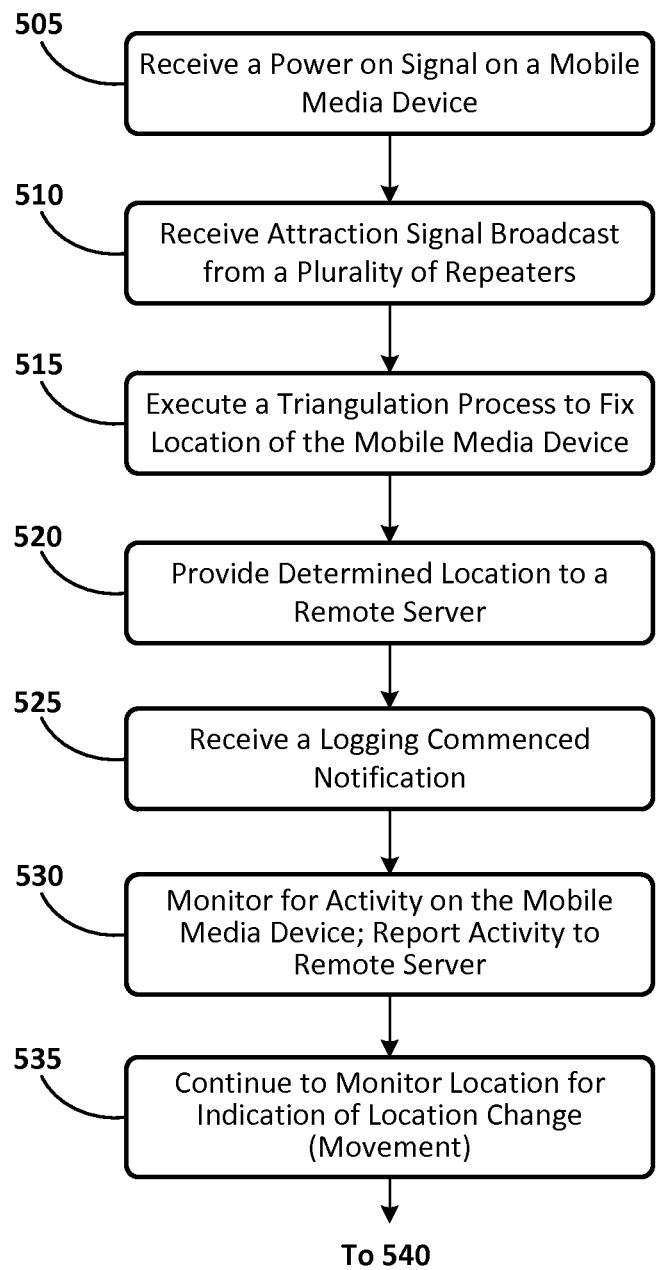
Figure 5B:
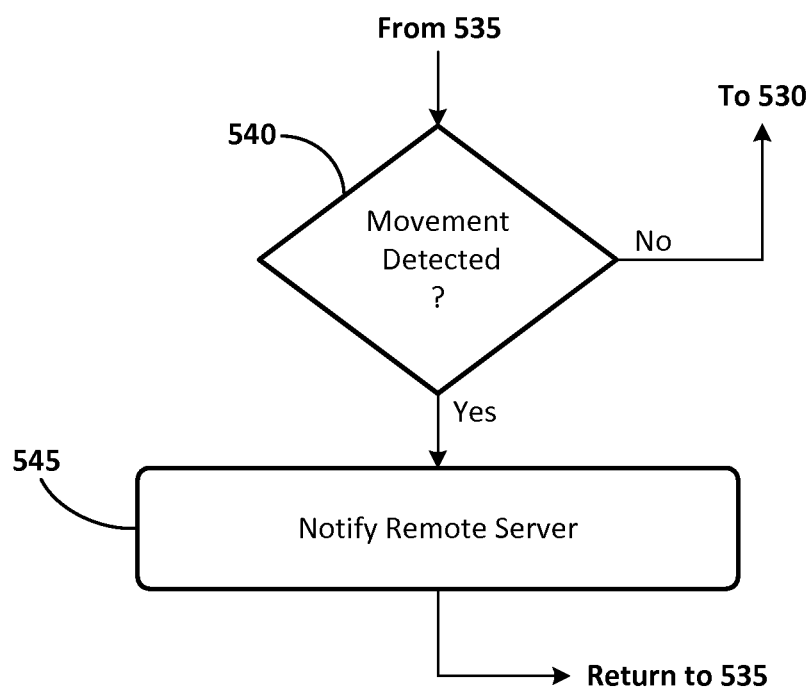

FIGS. 5A and 5B illustrate an alternate method for locating and logging mobile media devices during a media consumption study. In FIGS. 5A and 5B, mobile media device 606 is powered on in study site 65 while fixed media devices 61A and 61B are displaying media. The media device 606 is located initially in room A (see FIG. 10). In FIG. 5A, method 500 begins in block 505 with power on of the mobile media device 60B. In block 510, the media device 60B receives a signal from repeaters 66 in room A, B, and C. In block 515, processing in the mobile media device 606 executes a triangulation process that may unambiguously fix the position of the mobile media device 60B in room A. Presumably panelist 626 has possession of mobile media device 60B. In block 520, the mobile media device 626 provides its location information (which may be the triangulated position) to remote server 72. In block 525, the mobile media device 62B receives a notification from the server 62 that a logging session has begun. In block 530, system 200 determines if any activity occurs with the mobile media device 606 (e.g., the mobile media device 62B is used to access an Internet Web site), and the activity is noted by processing components in the mobile media device 62B and is reported to the remote server 72. In block 535, the system 200 in mobile media device 62B continues to determine location by triangulation. In block 540, the system 200 compares the most recent position location to previous location determinations to detect movement. In addition, sensors on board the mobile media device SOB may be used to provide or support movement determinations. In block 540, if movement is not detected, the method 500 returns to block 530. In block 540, if movement is detected, the method moves to block 545 and the mobile media device 606 notifies the remote server 72 and the system 200 computes and update location of the mobile media device. The method 500 then returns to block 535, and the method 500 continues until the mobile media device 60B is powered off or is removed from the study site 65.

Figure 6A:
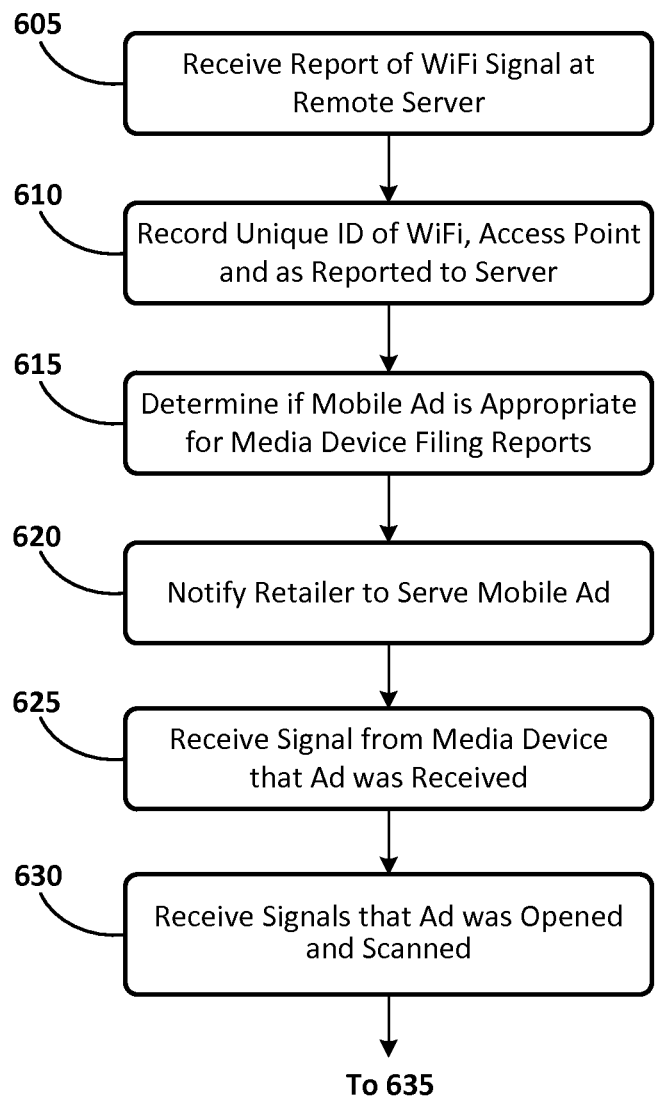
Figure 6B:
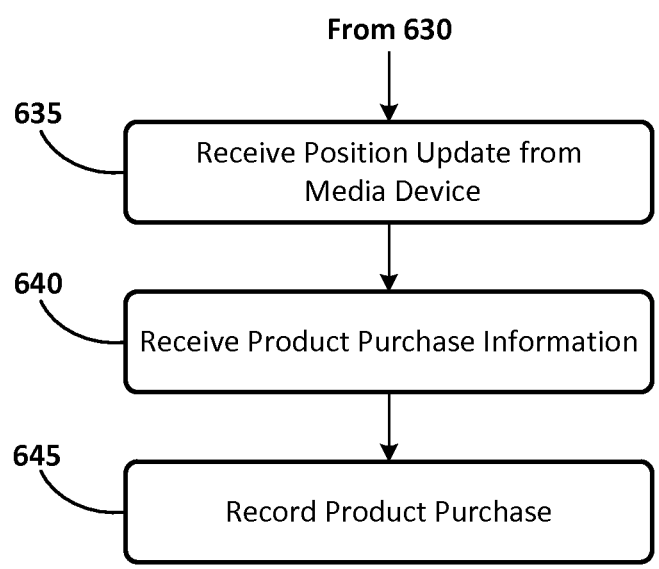

FIGS. 6A and 6B illustrate an example method for serving mobile advertisements to a mobile media device based on information gathered during a media consumption study. In FIGS. 6A and 6B, mobile media device 60B has been monitored for a period and certain activities related to operation of the mobile media device 60 have been detected and analyzed at remote server 72.

Further, in FIGS. 6A and 6B, mobile media device 60B is operated outside the study site 65, as shown, for example, in FIG. 1A and its location is monitored based on GPS tracking. In FIGS. 6A and 6B, example mobile advertising method 600 is described, and is based on a match process performed on the remote server 72. Method 600 begins in block 605 when the mobile media device 60B detects a WiFi attraction signal 46 broadcast from WiFi access point 40. Detection of the signal activates a trigger in the processing components of the mobile media device BOB, and the mobile media device 60B implements WiFi tracking (either switching to WiFi tracking exclusively, or in parallel with continued GPS tracking). In this block 605, the mobile media device 60B reports detection of the WiFi signal to the remote server 72. In block 610, the mobile media device 605 records the unique identifier of the WiFi access point 40 associated with retail store 30 and reports the identifier to the remote server 72. The remote server 72 now knows the identification of the mobile media device BOB, the location of the device (intercept of the WiFi signal 46 may serve as a proxy for nearness to the retail store 30 by the mobile media device 60B. In block 615, the remote server 72 determines from the recorded, processed, and analyzed media consumption information stored in data store 75 for mobile media device 60B, that panelist 62B may be interested in purchasing a product offered by retail store 30. For example, retail store 30 may be a coffee shop in a national chain of such stores, and the panelist 62B may have a history of viewing coffee advertisements from the chain. In block 620, the remote server 72 notifies a server in the retail store 30 that is should broadcast, or have broadcast, a mobile advertisement, for coffee to be received by mobile media device 60B. The retail store server broadcasts the advertisement (which may include a coupon) and the mobile media device 60B receives the mobile advertisement. The remote server 72, in block 625, receives a signal from the mobile media device 60B indicating the advertisement was received. In block 635, the remote server 72 receives a signal from the mobile media device 60B that the advertisement was opened and scanned by the panelist 62B. In block 630, the remote server 72 receives position location update signals from the mobile media device 60B indicating the panelist 62B is moving toward, and then entering the retail store 30. The panelist 62B purchases a coffee and scans a purchase barcode using the mobile media device 60B. In block 640, the remote server 72 receives the scanned barcode information indicating the panelist 62B purchased the coffee. In block 645, the remote server 72 records the purchase in a file associated with the panelist 728. The method 600 then ends.

Certain of the devices shown in the figures include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flow charts and accompanying description to illustrate the embodiments represented in FIGS. 4A-6B. The disclosed devices, components, and systems contemplate using or implementing any suitable technique for performing the steps illustrated. Thus, FIGS. 4A 6B are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

We claim:

1. A method for data logging in a panel media consumption study, comprising:
   broadcasting an attraction signal by a mobile media device associated with a panelist during display of media on a first fixed media device in an area of interest, the media for consumption by the panelist;
   receiving the attraction signal at a receiving device in the area of interest;
   determining information related to the received attraction signal;
   determining a characteristic value of the information;
   determining the characteristic value exceeds a threshold;
   identifying the device of the panelist as at a first location within the area of interest based on the characteristic value of the information, responsive to the determination that the characteristic value exceeds the threshold; and
   beginning logging data related to the display of media as panel media consumption data, responsive to the determination that the characteristic value exceeds the threshold.

2. The method of claim 1, further comprising:
   subsequent to beginning the data logging, determining a characteristic value of information of a subsequent broadcast attraction signal is less than the threshold; and
   ending the data logging.

3. The method of claim 1, further comprising:
   receiving the attraction signal at additional receiving devices within the area of interest; and
   using information from the attraction signal as received at the additional receiving devices to refine the first location of the panelist in the area of interest.

4. The method of claim 3, further comprising:
   receiving a signal from the first media device at one or more of the receiving devices;
   determining a location of the first media device based on the signal received from the first media device; and
   correlating the position of the first media device to first location of the panelist.

5. The method of claim 3, wherein information related to the received attraction signal comprises received signal strength of the attraction signal and a unique identification of the device of the panelist, the method further comprising:
   identifying a second location of the panelist in the area of interest based on subsequent attraction signals received from the device of the panelist; and
   computing a track of the device of the panelist based on two or more different identified locations of the device of the panelist.

6. A method for conducting a media consumption data study, comprising:
   recording media displayed on a first media device for consumption by a panelist; and
   attributing a position of the panelist based on a determined position of a device attributed to the panelist, comprising:
   estimating a first position of the device based on signals between the device and a position marker associated with the first media device,
   estimating second and subsequent positions of the device based on further signals between the device and the position marker, and
   determining a track of the device based on the first, second, and subsequent positions.

7. The method of claim 6, wherein the signals include an attraction signal broadcast by the position marker and a reception signal provided from the device attributed to the panelist based on a detected attraction signal at the device attributed to the panelist, wherein the reception signal comprises an identification of the device and a signal strength of the detected attraction signal.

8. The method of claim 6, wherein the signals include an attraction signal broadcast by the device attributed to the panelist and received at the position marker, wherein the attraction signal comprises an identification of the device, the method further comprising:
   recording the identification of the device attributed to the device attributed to the panelist and a received signal strength of the attraction signal as received at the position marker; and
   providing the identification and the received signal strength to a processor coupled to the position marker.

9. The method of claim 6, further comprising:
   conducting additional signaling between the device attributed to the panelist and additional position sensing devices; and
   using the additional signaling, producing a refined track of the device attributed to the panelist.

10. The method of claim 6, further comprising establishing a logging session based on a period beginning with the first estimated position and ending when subsequent positions cannot be estimated.

11. The method of claim 6, wherein the attraction signal is a WiFi signal.

12. The method of claim 6, wherein the attraction signal is a Bluetooth Low Energy signal.

13. The method of claim 6, wherein the attraction signal is an acoustic signal.

14. The method of claim 6, wherein the device attributed to the panelist is a mobile media device, the method further comprising serving media at the mobile media device based on the determined track of the mobile media device.

15. A system for determining, recording, and analyzing media consumption, comprising:
   an instrumented study site comprising one or more first media devices displaying media for consumption by a viewer, comprising:
   a plurality of position markers that exchange broadcast and reply signals with a mobile media device attributed to the viewer, and
   a server that:
   receives information related to the broadcast and received signals from the plurality of position markers and the mobile media device attributed to the viewer;
   analyzes the received signals to locate the mobile media device attributed to the viewer in the study site, and
   defines the position of the viewer as coinciding with the location of the mobile media device; and
   receives information related to the displayed media; and attributes media as consumed by the viewer based on the received information related to the displayed media and the defined position of the viewer based on the analyzed received signals.

16. The system of claim 15, wherein the signals are Bluetooth Low Energy signals and the server is located remotely from the study site.

17. The system of claim 15, wherein the signals are Bluetooth signals and the server is located remotely from the study site.

18. The system of claim 15, wherein the server is located with the study site.

19. A method for conducting a panel-based media consumption study, comprising:
- establishing a plurality of study sites for logging media consumption data for the study;
- identifying one or more panelists to participate in the study;
- detecting display of media at one of the study sites;
- determining a position of a panelist in a study site at which the media is displayed, comprising:
  - receiving at a first device associated with the study site, signals from a second device associated with the panelist,
  - analyzing the received signals to locate the second device in the study site, and
  - defining the position of the panelist as coinciding with the location of the second device; and
- conducting a media consumption data logging operation based on the defined position of the panelist.

* * * * *